United States Patent
Baker et al.

(10) Patent No.: US 8,390,514 B1
(45) Date of Patent: Mar. 5, 2013

(54) DETECTION AND GEOLOCATION OF TRANSIENT SIGNALS RECEIVED BY MULTI-BEAMFORMING ANTENNA

(75) Inventors: James Bryan Baker, Kent, WA (US); Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 12/685,267

(22) Filed: Jan. 11, 2010

(51) Int. Cl.
*H01Q 3/00* (2006.01)

(52) U.S. Cl. ............ 342/368; 367/97; 367/98; 367/122; 342/417

(58) Field of Classification Search .................. 342/377, 342/368, 417; 367/97–98, 122
See application file for complete search history.

(56) References Cited

U.S. PATENT DOCUMENTS

| | | | | |
|---|---|---|---|---|
| 5,831,936 A | * | 11/1998 | Zlotnick et al. | 367/124 |
| 6,016,124 A | | 1/2000 | Lo et al. | |
| 6,046,961 A | * | 4/2000 | Griffin et al. | 367/153 |
| 6,614,859 B2 | * | 9/2003 | Lay | 375/341 |
| 7,459,962 B2 | * | 12/2008 | Baker | 327/551 |
| 2005/0222842 A1 | * | 10/2005 | Zakarauskas | 704/233 |

OTHER PUBLICATIONS

Cantrell et al., "Affordable Naval Surveillance Radar Concept," Radar Conf, 2007 IEEE, Apr. 17-20, 2007, pp. 414-420.
Nishio et al., "A High-Speed Adaptive Antenna Array With Simultaneous Multibeam-Forming Capability," IEEE Trans. Microwave Theory and Techniques, vol. 51, No. 12, Dec. 2003, pp. 2483-2494.
Neasham et al., "Broadband, Ultra-sparse Array Processing for Low Complexity Multibeam Sonar Imaging," Ocean, Jun. 18-21, 2007, pp. 1-6.

* cited by examiner

*Primary Examiner* — Gregory C Issing
*Assistant Examiner* — Nga X Nguyen
(74) *Attorney, Agent, or Firm* — Ostrager Chong Flaherty & Broitman P.C.

(57) ABSTRACT

A bank of order statistic filters applied to a set of antenna or transducer beams are used to detect and determine the line-of-bearing to the source of transient RF (or other, e.g., acoustic) signals. By applying order statistic filters to signals received by a set of antenna or transducer beams, this system sets a detection threshold that is unaffected by transient signals, thereby allowing the detection of these transient signals. Knowing which antenna beam the transient signals are located within allows the determination of a line of bearing to the source of the transient signals.

14 Claims, 4 Drawing Sheets

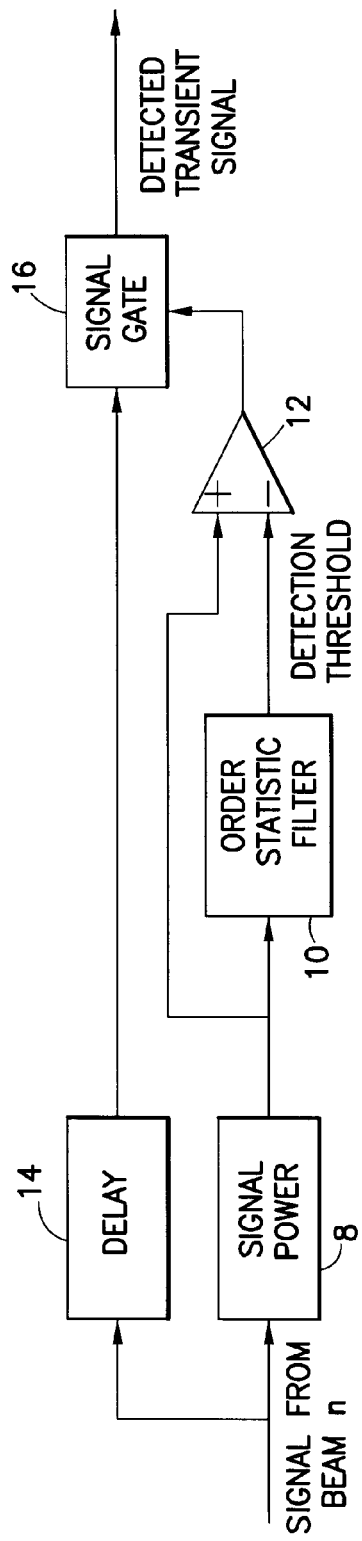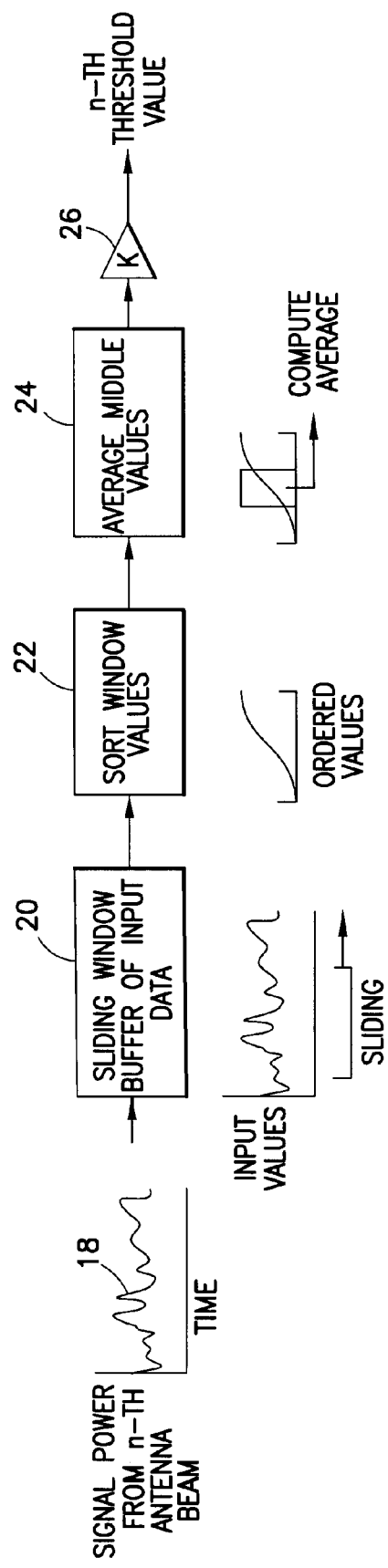

DETECTION AND GEOLOCATION OF TRANSIENT SIGNALS RECEIVED BY MULTI-BEAMFORMING ANTENNA

BACKGROUND

This invention generally relates to systems and methods for detecting and determining a line-of-bearing to transient radiofrequency (RF) or acoustic signals received by an antenna or transducer having multi-beamforming capability. The invention will be described as applying to RF signals received by antenna arrays, but can just as easily be described, mutatis mutandis, as applying to acoustic signals received by transducer arrays as well.

A typical system that would be employed to detect and determine a line-of-bearing to transient RF signals would use either a fast-scanning single-beam antenna to cover a large geographical area or multibeam antenna, such as a digital beamforming antenna, that can simultaneously cover the same geographical area as a scanning antenna. These systems would typically use a linear, low-pass filter at the output of each beam to determine the noise level of the environment, from which a detection threshold is derived. When an incoming signal exceeds the detection threshold, a signal detection is declared.

Single-beam scanning systems are inadequate for detection of short-duration transient signals simply because the antenna beam may not be pointed at the source of the transient signal during its transmission. Hence, the system would miss the transient signal entirely. Systems which scan faster in order to cover a desired geographical region more quickly, and not miss short-duration transient signals, result in the antenna beam only partially capturing longer-duration transient signals as the antenna beam scans by them. Widening the single-beam partially solves this problem, but results in a reduction in the accuracy of a line-of-bearing measurement to the source of the transient signal. As a result of these difficulties, a multibeam system is required for an effective solution.

Existing multibeam solutions typically apply linear low-pass filters to the output of each beam of an antenna to determine the average RF noise level of the environment, from which a detection threshold is derived. When a signal exceeds this threshold, detection of a transient signal is declared. It is desired that the detection threshold remain above the background noise level and above the level of long-duration continuous-wave (CW) signals so that noise and long-duration signals are not reported as transient signals. It is also desirable that this detection threshold remain below the level of transient signals so that these transient signals will be detected when they exceed the detection threshold. Hence, it is desired that the detection threshold remain unaffected by transient signals. This does not happen with linear filters. Due to the nature of the linear low-pass filter used to derive the detection threshold described above, the threshold is based upon the average signal power, regardless of whether the signal is a CW signal or a transient signal. Although one can reduce the effect that transient signals have on a linear, low-pass filters output by lowering the filters cutoff frequency, doing so introduces the problem of long settling times required when setting the threshold level.

U.S. Pat. No. 7,459,962 discloses a system and a method for detecting transients within a signal having a varying noise floor and long-duration CW signals without the transients themselves influencing the setting of the detection threshold. This is accomplished using nonlinear, order statistic filters applied to power spectral estimates of ambient signals.

There is a need for a system and a method for detecting and determining the line-of-bearing to transient signals received by a multi-beamforming antenna which do not suffer from the aforementioned disadvantages.

BRIEF SUMMARY

The present invention utilizes a bank of order statistic filters applied to a set of antenna (or transducer) beams to detect and determine the line-of-bearing to the source of transient RF (or other, e.g., acoustic) signals. By applying order statistic filters to outputs representing a set of antenna beams, this system sets a threshold that is unaffected by transient signals, thereby allowing the detection of these transient signals. Knowing which antenna beam the transient signals are located within allows the determination of a line of bearing to the source of the transient signals.

One embodiment of the invention employs a digital beamforming antenna to simultaneously capture transient signals over a wide geographical region, allowing for good line-of-bearing accuracy over the region, and also employs order statistic filters to set the detection threshold, which results in a detection threshold that is unaffected by transient signals. Alternatively, a single-aperture phased-array antenna could be used.

The multi-beam aspect of this invention allows for the simultaneous coverage of a large geographical area while providing improved line-of-bearing accuracy as compared to traditional solutions. The use of order statistic filters allows for setting a detection threshold for transient signals that is unaffected by the transient signals themselves, whereas existing solutions that utilize linear low-pass filters to set the detection threshold would be affected by the transient signals themselves, resulting in missed detections of new transient signals as the detection threshold is increased by previous transient signals.

Other aspects of the invention are disclosed and claimed below.

BRIEF DESCRIPTION OF THE DRAWINGS

FIG. 2 is a block diagram showing a signal processing element applied to each output beam signal line from the beamforming electronics depicted in FIG. 1.

FIG. 3 is a flowchart showing the sequence of operations performed by the order statistic filter depicted in FIG. 2.

DETAILED DESCRIPTION

The preferred embodiments of the present invention disclosed herein include a front end comprising an antenna array and associated beamforming electronics for outputting a multiplicity of beam signals, and a back end comprising a corresponding multiplicity of signal processing elements (including respective order statistic filters) for detecting the presence of transient signals in the multiplicity of beam signals.

Figure 1:
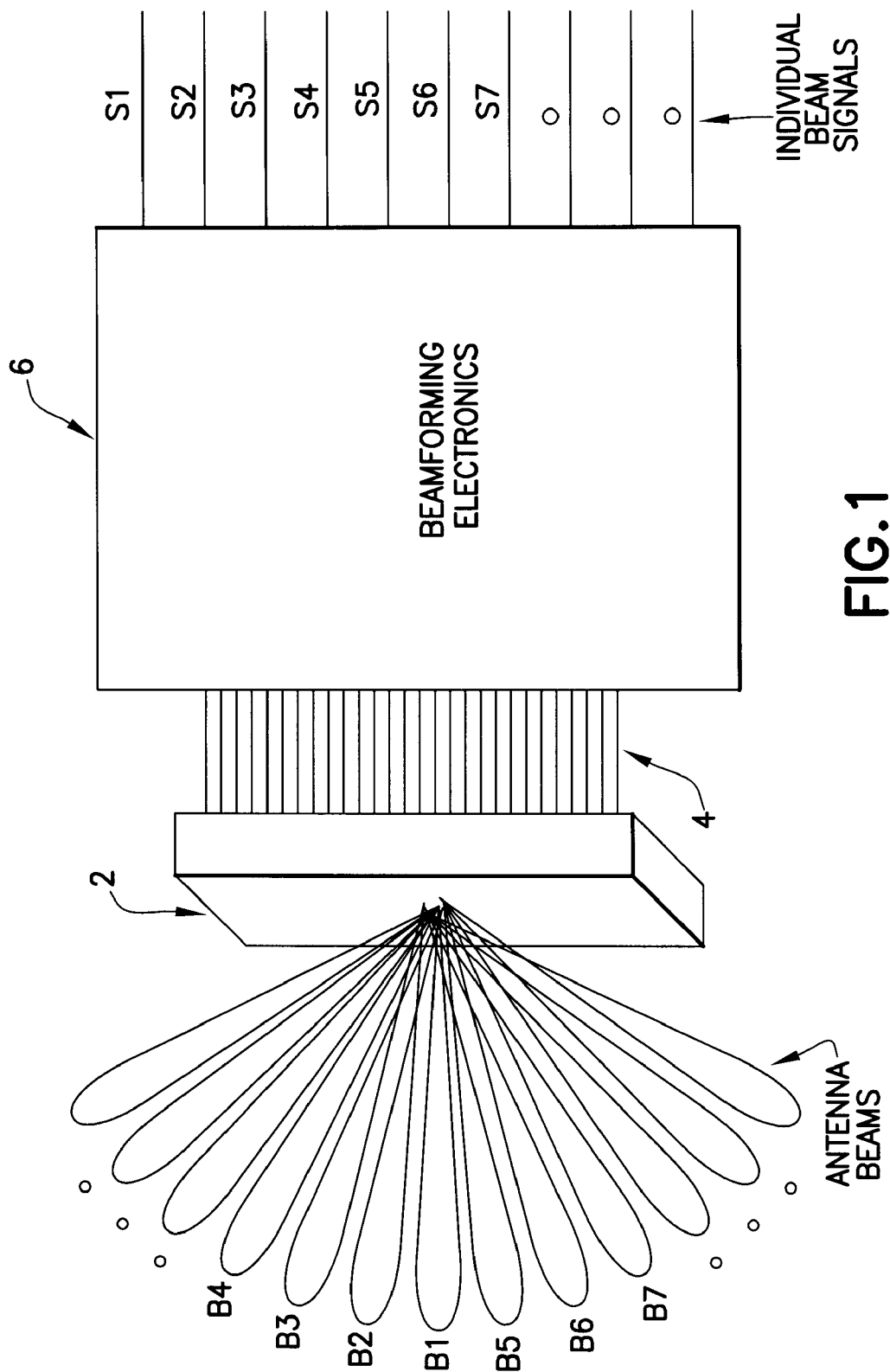
FIG. 1 is a high-level diagram showing components of the front end of a system in accordance with one embodiment of the invention.

The front end, as shown in FIG. 1, comprises an antenna array 2 having multi-beamforming capability followed by beamforming electronics 6 which provide separate output lines for individual beam signals S1, S2, S3, etc. representing the signal information contained within each of the antenna beams B1, B2, B3, etc. respectively. That is, the output of line S1 contains all of the signals present within antenna beam B1, and likewise for lines 2, 3, 4, etc. The antenna array 2 outputs received signal information to the beamforming electronics via a multiplicity of antenna element feeds 4.

In a preferred embodiment, a digital beamforming antenna is used. Digital beamforming is a combination of antenna technology and digital technology. A generic digital beamforming antenna system is comprised of three major components: an antenna array, a digital transceiver, and a digital signal processor (DSP). In a digital beamforming antenna system, the received signals are digitized at the element level. Digital beamforming is based on capturing the radio frequency (RF) signals at each of the antenna elements and converting them into two streams of binary baseband signals known as the in-phase (I) and quadrature-phase (Q) channels. Included within the digital baseband signals are the amplitudes and phases of signals received at each element of the array. The beamforming is accomplished by weighting these digital signals, thereby adjusting their amplitudes and phases, such that when added together they form the desired beam.

More broadly, the antenna may be any known antenna or transducer array having multi-beamforming capability. Exemplary multi-beamforming arrays are disclosed in the following references: (1) "Radar Handbook," Merrill Skolnik (Editor in Chief), Second Edition, McGraw-Hill Inc., 1990; (2) "Affordable Naval Surveillance Radar Concept", Cantrell, B., et al., Radar Conference, 2007 IEEE, 17-20 Apr. 2007, pp. 414-420; (3) "A High-Speed Adaptive Antenna Array with Simultaneous Multibeam-Forming Capability", Nishio, T., et al., Microwave Theory and Techniques, IEEE Transactions on Microwave Theory and Techniques, Vol. 51, No. 12, December 2003, pp. 2483-2494; and (4) IEE Colloquium on "Multiple Beam Antennas and Beamformers," Digest No. 136, 21 Nov. 1989; and (5) "Broadband, Ultra-sparse Array Processing for Low Complexity Multibeam Sonar Imaging", Neasham et al., Ocean, 2007, Jun. 18-21, 2007, pp. 1-6. Alternatively, a single-aperture phased-array antenna could be used.

The processing of the signal information could be accomplished in either hardware or software. Generally speaking, for any implementation of this system, there would be an antenna that produces an analog electrical signal that is processed downstream by electronics. This downstream electronics will consist of analog electronics connected to the antenna, followed by an analog-to-digital converter (ADC), and then followed by digital electronics. When designing the system, the ADC can be placed at different locations in the processing stream. In accordance with a preferred embodiment, the ADC is placed in the beamforming electronics 6, so that each output S1, S2, etc. in FIG. 1 consists of a stream of digital numbers.

Each of the output lines S1, S2, etc. from the beamforming electronics 6 is connected to an input line of a respective signal processing element. FIG. 2 shows the components of a preferred embodiment of a signal processing element for use in the system disclosed herein. It should be appreciated that the signal processing element shown in FIG. 2 is replicated for each of the output beam signal lines S1, S2, etc. shown in FIG. 1. In accordance with a preferred embodiment, each signal processing element comprises a signal power block 8, an order statistic filter 10, a comparator 12, a delay block 14 and a signal gate 16. Assuming that FIG. 2 depicts the n-th signal processing element, then the signal power block 8 receives a stream of digital numbers representing the signal information from the n-th antenna beam. The delay block 14 receives the same digital signal information. The signal gate 16 outputs the transient signal detected in the digital signal information from the n-th antenna beam.

The signal processing element depicted in FIG. 2 works as follows: the signal power block 8 computes the power of the signal from the n-th antenna beam. The computed signal power is outputted to the order statistic filter 10 and to one input of the comparator 12. The order statistic filter 10, as described below, derives a detection threshold based on the power level of the signal. A signal representing the detection threshold is outputted to the other input of comparator 12. The comparator 12 compares the signal power level with the detection threshold, and when the former exceeds the latter, the output of the comparator goes high, indicating a transient signal has been detected; otherwise the comparator output is low.

The delay block 14 receives the signal from the n-th antenna beam and outputs it to the signal gate 16 after a time interval. The duration of the time interval is selected to account for the net delay in the lower processing blocks (items 8, 10 and 12 in FIG. 2), thereby ensuring that the system stays synchronized.

The output of comparator 12 is received by a control input of the signal gate 16. When the comparator output goes high, the signal gate 16 is opened, allowing the signal from the n-th antenna beam to pass through to downstream electronics (not shown). Because the system knows the direction of the n-th antenna beam, the downstream electronics can determine the line of bearing of the source of the detected transient signal.

The details of the order statistic filter are shown in FIG. 3. As previously noted, the order statistic filter's input data represents the power level of the signal environment within the n-th antenna beam, represented by the line 18 on the graph of signal power versus time shown on the far left in FIG. 3. The order statistic filter shown in FIG. 3 performs the following functions: First, a sliding-window buffer of input data is gathered from the filter's input in step 20. Next, in step 22 the window of data is sorted, which orders the data from the smallest value to the largest value, as seen in the graph below block 22. Next, in step 24 the middle portion of the ordered data is averaged, and then this average value is multiplied by a constant K in step 26 to produce a scaled average signal value representing the detection threshold value for the n-th antenna beam.

It should be appreciated that a multiplicity of order statistic filters can be arranged to receive the signal power from a corresponding multiplicity of antenna beams in parallel, and thus can operate simultaneously to provide detection of transients over multiple antenna beams acquired by an antenna array. Furthermore, the order statistic filters are preferably of identical construction. In accordance with alternative embodiments, the signal information for each antenna beam can be filtered to separate the signal information for one beam into non-overlapping bandwidth portions, the bandwidths being selected in accordance with the bandwidths of the transient signals to be detected, as taught in U.S. Pat. No. 7,459,962, the disclosure of which is incorporated herein in its entirety. In that event, the signal information for each bandwidth portion of each antenna beam would be sent to a respective signal processing element of the type shown in FIG. 2. In other words, each individual beam signal output from the beamforming electronics 6 shown in FIG. 1 would be separated into a plurality of bandwidth portions, the signal information for each bandwidth portion being sent to a respective signal processing element.

The sliding window buffer disclosed herein is a well-known form of buffer that takes a series of "time window" segments or "time slices" of an input signal having a predetermined overall duration. The time windows may vary in duration, depending on the range of durations of the transient signals being detected and, if the signals are separated into differing bandwidth portions, depending on the size of the predetermined bandwidth portions that have been selected. Preferably the time windows overlap slightly, although this is not absolutely necessary. Each time window defines a time segment during which specific magnitude values of the signal power are obtained, buffered, and then transmitted to the sorting subsystem. The specific magnitude values are transmitted to the sorting subsystem sequentially. They may each be transmitted either immediately after they are obtained, or they can all be transmitted sequentially as part of a group after the sliding window buffer has acquired all of the specific magnitude values. Either way, the sorting subsystem receives a serial stream of specific magnitude values that each represent a portion of the signal power values over time for a given antenna beam and, if separated into different bandwidth portions, over the predetermined bandwidth portion. As previously disclosed, the sorting subsystem then sorts specific magnitude values received from the sliding window buffer and orders those magnitude values from the smallest value to the largest value, as seen in the graph below block 22 in FIG. 3.

Next, an averaging circuit receives the ordered values from the sorting subsystem and determines an average magnitude value for a preselected center (i.e., middle) range of the ordered values. This is accomplished by discarding the specific signal power magnitude values from the sliding window buffer that fall outside the preselected center range of values. It will be appreciated that the specific magnitude values will each be represented by positive real numbers. Only those values falling within the preselected center range of the overall range of ordered values are used in determining the average signal power magnitude value. The preselected center range may preferably include approximately 20 to 40% of the ordered magnitude values, and still more preferably may include one-third of the ordered magnitude values. However, the precise range of ordered values selected will vary based on the specific needs of a particular application.

Finally, the ordered values in the center range are averaged. The average signal power magnitude value is then output to a multiplier where it is multiplied (i.e., scaled) by a factor K to produce a scaled, average signal power magnitude value that is used to set the transient threshold detection value for the particular antenna beam, or for a predetermined bandwidth portion of a particular antenna beam.

It should be appreciated that the system operates to generate an average signal power magnitude value from the group of specific signal power magnitude values that are supplied from the sliding window buffer for each sampling cycle. Since the process of obtaining the average signal power magnitude value involves discarding those values that fall outside the preselected center range, those specific signal power magnitude values that might be the result of transients themselves, whose power exceeds that of the background noise, are removed from the process by which the transient detection threshold is being set. More specifically, they are removed from the group of specific signal power magnitude values that are used to formulate the average signal power magnitude value. As a result, they do not influence the determination of the transient detection threshold.

The property of the order statistic filter which prevents transient signals from affecting the filter's output (the threshold value) is the following: Suppose the input to the order statistic filter contains only relatively small values due to the low-power background noise. Then all of the ordered values from the sliding window will be small. If large values then begin to appear at the filter's input due to a new, relatively higher-power transient signal in the signal environment, all of these large values will be placed in the upper part of the set of ordered values, lying outside a range of ordered values in the middle of the overall range. And so when the average of the values in the middle section is computed, none of the large values due to the transient signal will be included, and hence the threshold value will not be influenced by the transient signal. As long as the transient signal ceases before its values start filling in the middle section of the ordered values, the transient signal will have no effect on the filter output. It should be noted, therefore, that it is necessary to design the order statistic filter with a maximum allowable duration for a transient signal in mind.

Figure 4:
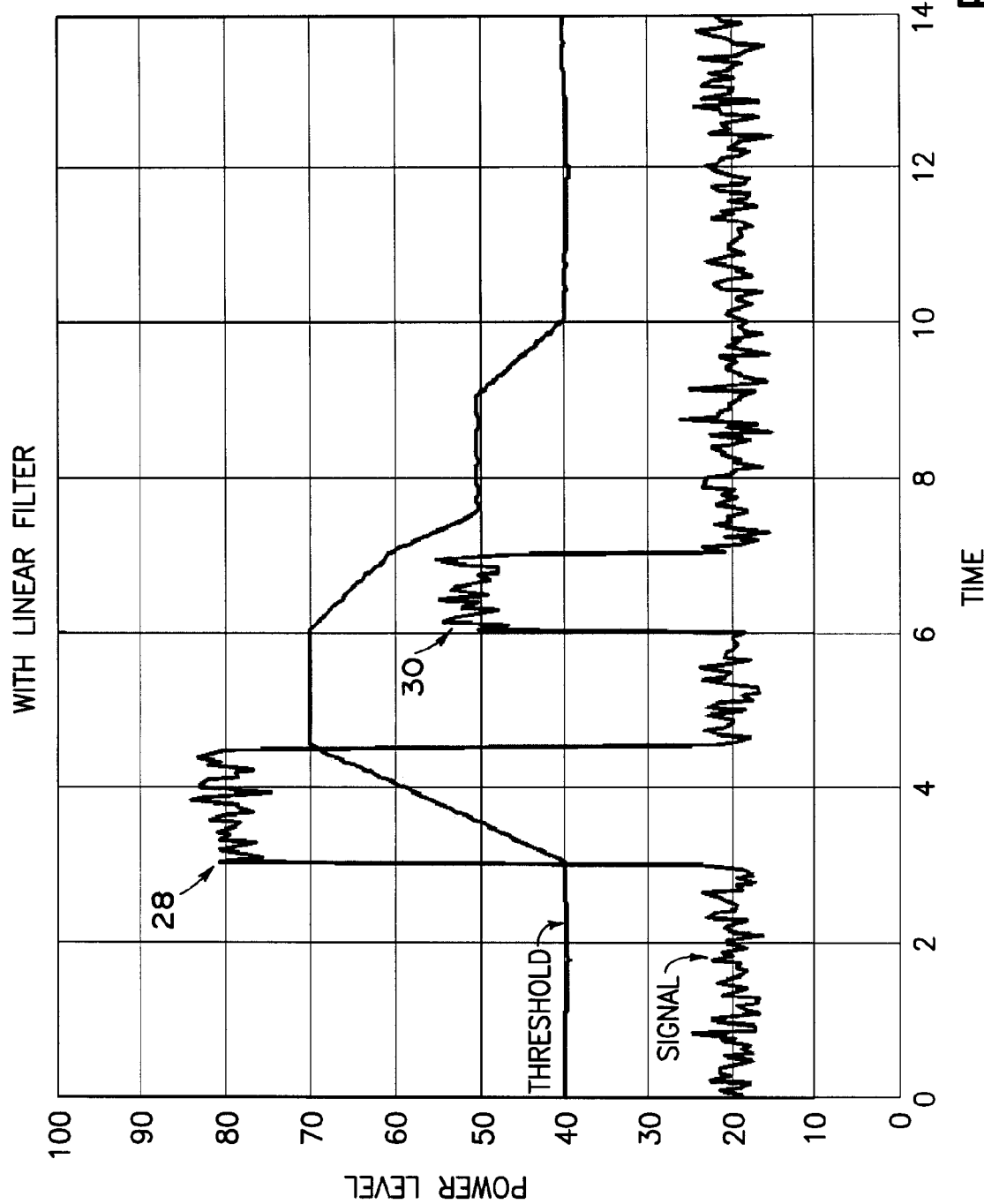
FIG. 4 is a graph showing power level versus time for the case where a linear low-pass filter is used to set the detection threshold.
Figure 5:
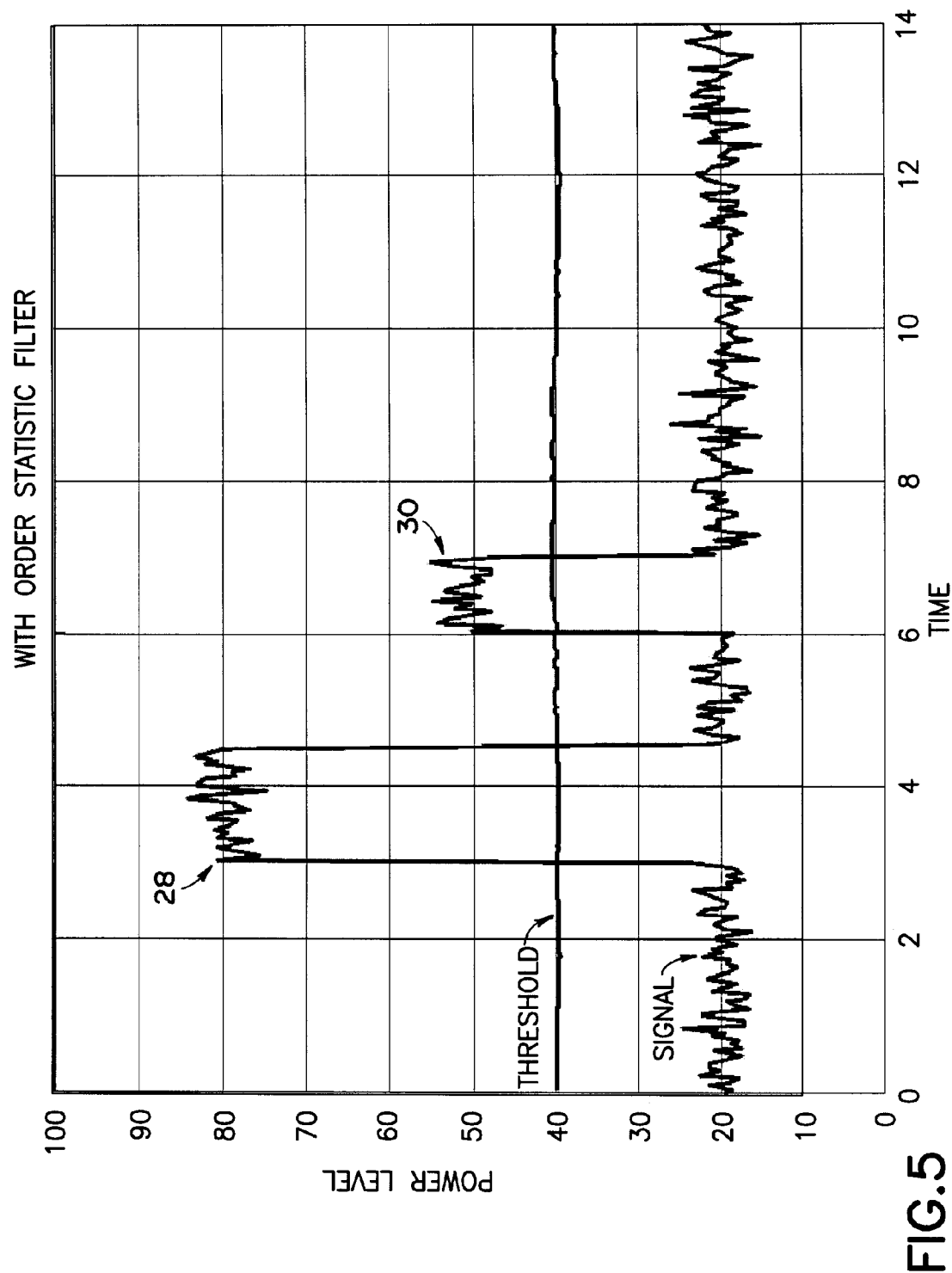
FIG. 5 is a graph showing power level versus time for the case where an order statistic filter of the type depicted in FIG. 3 is used to set the detection threshold.

FIGS. 4 and 5 show the results of a linear filter versus an order statistic filter for setting the detection threshold. In both figures, the signal is located within a single beam of the antenna, and there are two transient signals present. For the signal power magnitude values seen in FIG. 4 a linear filter was used to set the detection threshold. As can be seen, although the first transient signal 28 exceeds the threshold level and is therefore detected, the detection threshold is increased by the first transient signal 28 to the extent that the second transient signal 30 does not exceed the threshold, and therefore is not detected. Hence, with this scheme, the second transient signal is missed.

The same signal power magnitude values are shown in FIG. 5. For the case depicted in FIG. 5, an order statistic filter was used to set the detection threshold. In this case, the detection threshold remains unaffected by the two transient signals 28 and 30, and as a result, both transient signals can be successfully detected.

The signal processing elements disclosed herein can be implemented in software or hardware. The digital processing of the stream of digital numbers could be performed directly with digital hardware (e.g., logic gates, Programmable Array Logic (PALs), Field Programmable Gate Arrays (FPGAs) programmed with firmware, etc.). Alternatively, the stream of digital numbers could be read into a microprocessor (e.g., a DSP) and the processing performed with software running on that microprocessor. Again, it could be done either way, or in some combination. In the latter case, all of the blocks in FIG. 2 could represent lines of code running on a DSP microprocessor, such as the Texas Instruments TMS320 series.

As described above, this invention allows the detection of transient RF signals within a wide geographic area, and, knowing which antenna beam the transient signals are located within, allows the determination of a line of bearing to the source of the transient signal. However, the invention is not limited to the detection of transient RF signals and could be used to detect non-RF transient signals, e.g., transient acoustic signals.

The invention offers an improved solution for direction finding of transient signals. The resulting performance increase would be substantial under certain conditions which are applicable to wide-area surveillance aircraft, which see many interfering signals within their surveillance volume. Transient signals are very difficult to detect under these conditions.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. A system comprising:
an antenna or transducer array;
beamforming electronics for receiving signals from said array and outputting first and second beam signals; and
first and second signal processing elements for detecting the presence of transient signals in said first and second beam signals respectively;
said first signal processing element comprising:
a first order statistic filter that outputs a first detection threshold;
first signal power computing means for computing the power of said first beam signal and outputting a first signal representing the computed power of said first beam signal to said first order statistic filter; and
a first comparator that outputs a first control signal when the output of said first signal power computing means exceeds said first detection threshold;
said second signal processing element comprising:
a second order statistic filter that outputs a second detection threshold;
second signal power computing means for computing the power of said second beam signal and outputting a second signal representing the computed power of said second beam signal to said second order statistic filter; and
a second comparator that outputs a second control signal when the output of said second signal power computing means exceeds said second detection threshold.

2. The system as recited in claim 1, wherein said first signal processing element further comprises a first signal gate having an input for receiving said first beam signal, said first signal gate passing said first beam signal to an output when the output of said first comparator is said first control signal and not passing said first beam signal to said first signal gate output when the output of said first comparator is not said first control signal, and said second signal processing element further comprises a second signal gate having an input for receiving said second beam signal, said second signal gate passing said second beam signal to an output when the output of said second comparator is said second control signal and not passing said second beam signal to said second signal gate output when the output of said second comparator is not said second control signal.

3. The system as recited in claim 2, wherein said first signal processing element further comprises first delay means for outputting said first beam signal to said first signal gate after a first delay time interval, and said second signal processing element further comprises second delay means for outputting said second beam signal to said second signal gate after a second delay time interval.

4. The system as recited in claim 1, wherein said first order statistic filter comprises: a first sliding window buffer having an input that receives said first signal and an output; first means for ordering magnitude values of said first signal output by said first sliding window buffer; first means for averaging a subset of ordered magnitude values from said first ordering means, said subset including magnitude values in a middle range and excluding higher and lower magnitude values lying outside said middle range; and first means for multiplying the average of said subset of ordered magnitude values by a scaling factor, the product being said first detection threshold, and said second order statistic filter comprises: a second sliding window buffer having an input that receives said second signal and an output; second means for ordering magnitude values of said second signal output by said second sliding window buffer; second means for averaging a subset of ordered magnitude values from said second ordering means, said subset including magnitude values in a middle range and excluding higher and lower magnitude values lying outside said middle range; and second means for multiplying the average of said subset of ordered magnitude values by a scaling factor, the product being said second detection threshold.

5. A method of processing beam signals output by a multi-beamforming antenna or transducer array, said beam signals representing signal information of respective beams, comprising the following steps:
deriving a first detection threshold from a first beam signal, said first detection threshold being independent of the magnitude values of any portions of said first beam signal representing transient signals;
deriving a second detection threshold from a second beam signal, said second detection threshold being independent of the magnitude values of any portions of said second beam signal representing transient signals;
extracting any portions of said first beam signal having magnitude values greater than said first detection threshold; and
extracting any portions of said second beam signal having magnitude values greater than said second detection threshold;
wherein said deriving a first detection threshold step comprises computing the power of said first beam signal, producing a first signal representing the computed power of said first beam signal, and order statistic filtering said first signal to produce said first detection threshold; and
wherein said deriving a second detection threshold step comprises computing the power of said second beam signal, producing a second signal representing the computed power of said second beam signal, and order statistic filtering said second signal to produce said first detection threshold.

6. The method as recited in claim 5, wherein said extracting step comprises outputting a first control signal when the computed power of said first beam signal exceeds said first detection threshold, and passing said first beam signal to an output in response to outputting of said first control signal.

7. The method as recited in claim 6, wherein said order statistic filtering comprises: sliding window buffering said first signal; ordering magnitude values of said first signal; averaging a subset of said ordered magnitude values, said subset including magnitude values in a middle range and excluding higher and lower magnitude values lying outside said middle range; and multiplying the average of said subset of ordered magnitude values by a scaling factor, the product being said first detection threshold.

8. A system for determining a line-of-bearing to a source of transient signals, comprising:
an antenna or transducer array;
beamforming electronics for receiving signals from said antenna array and outputting first through n-th beam signals respectively representing signal information in first through n-th beams respectively arriving at first through n-th angles relative to said antenna array; and
first through n-th signal processing elements for detecting the presence of transient signals in said first through n-th beam signals respectively, wherein each of said first through n-th signal processing elements comprises a respective order statistic filter that outputs a respective detection threshold, where n is a positive integer greater than unity;

said first through n-th signal processing elements further comprising a respective signal power computing means for computing the power of a respective one of said first through n-th beam signals and outputting a signal representing the computed power of said respective one of said first through n-th beam signals to a respective order statistic filter; and each of said first through n-th signal processing elements further comprising a respective comparator that outputs a respective control signal when the output of said respective signal power computing means exceeds said respective detection threshold.

9. The system as recited in claim 8, wherein each of said first through n-th signal processing elements further comprises a respective signal gate having an input for receiving a respective one of said first through n-th beam signals, said respective signal gate passing said respective one of said first through n-th beam signals to an output when the output of said respective comparator is said respective control signal and not passing said respective one of said first through n-th beam signals to said respective signal gate output when the output of said respective comparator is not said first control signal.

10. The system as recited in claim 9, wherein each of said first through n-th signal processing elements further comprises respective delay means for outputting said respective one of said first through n-th beam signals to said respective signal gate after a respective delay time interval.

11. The system as recited in claim 8, wherein each order statistic filter comprises: a sliding window buffer having an input that receives a respective one of said first through n-th signals and an output; means for ordering magnitude values of said respective one of said first through n-th signals output by said sliding window buffer; means for averaging a subset of ordered magnitude values from said ordering means, said subset including magnitude values in a middle range and excluding higher and lower magnitude values lying outside said middle range; and means for multiplying the average of said subset of ordered magnitude values by a scaling factor, the product being a respective detection threshold.

12. A system for determining a line-of-bearing to a source of transient signals, comprising:

an antenna or transducer array that sends signals to beam-forming electronics that output a multiplicity of beam signals representing signal information in a corresponding multiplicity of beams impinging on said array;

a multiplicity of signal processing elements for detecting the presence of transient signals in said signals, each of said multiplicity of signal processing elements comprising a respective order statistic filter that outputs a respective order detection threshold;

said multiplicity of signal processing elements further comprising a respective signal power computing means for computing the power of a respective one of said multiplicity of multiplicity of beam signals and outputting a signal representing the computed power of said respective one of said multiplicity of beam signals to a respective order statistic filter; and each of said multiplicity of signal processing elements further comprising a respective comparator that outputs a respective control signal when the output of said respective signal power computing means exceeds said respective detection threshold.

13. The system as recited in claim 12, wherein each of said order statistic filters comprises a sliding window buffer that buffers the output from a respective one of said multiplicity of signal power computing means.

14. The system as recited in claim 13, wherein each of said order statistic filters further comprises means for sorting magnitude values received from said sliding window buffer in order from lowest to highest magnitude values, means for averaging middle magnitude values of said sorted magnitude values, and a multiplier for multiplying the average magnitude value by a scaling factor, the product being said respective detection threshold.

\* \* \* \* \*